UNITED STATES PATENT OFFICE.

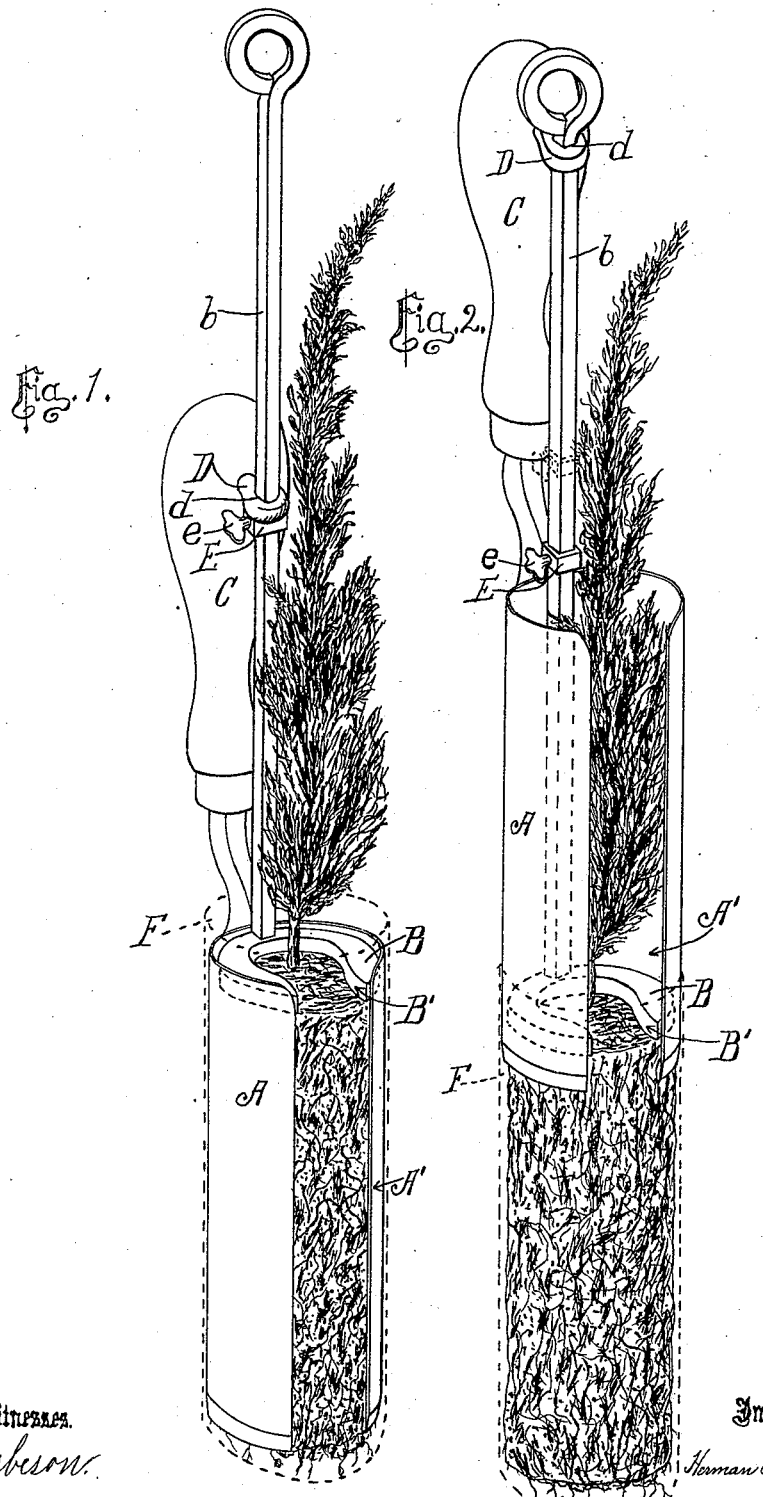

HERMAN BALDRIDGE, OF LOS ANGELES, CALIFORNIA.

TRANSPLANTER FOR TREES OR FLOWERS.

SPECIFICATION forming part of Letters Patent No. 522,039, dated June 26, 1894.

Application filed June 1, 1893. Serial No. 476,250. (No model.)

*To all whom it may concern:*

Be it known that I, HERMAN BALDRIDGE, a citizen of the United States, residing at Los Angeles, in the county of Los Angeles and State of California, have invented a new and useful Improvement in Transplanters for Trees or Flowers, of which the following is a specification.

One object of my invention is to provide improved means for removing trees and shrubs from tubular transplanters.

A further object of my invention is to provide improved means for gaging the length of the cylinder of soil removed with the tree or plant by such transplanter, and to gage the depth of the hole in which the plant is to be set.

A further object of my invention is to provide means for quickly and cheaply removing trees from the ground and preparing them for transportation and replanting at a distance from the place where they are grown.

My invention broadly stated, comprises the combination with a transplanter consisting of a tubular blade provided with a handle and having a slot in one side to allow the introduction of a plant into such blade, of a follower arranged to reciprocate in such tubular blade and provided with an opening arranged and adapted to allow the introduction of the tree into such blade through the slot therein and a plunger arranged to reciprocate the follower.

My invention further comprises a transplanter having a tubular blade provided in one side with a slot and provided with a handle; a plunger guide fixed to such handle; a follower arranged to reciprocate in such tubular blade and provided with a plant receiving opening arranged to receive the plant therein through the slot in the tubular blade; a plunger arranged in the plunger guide and provided with an adjustable stop; and such stop, adapted to be adjusted upon the plunger to engage the plunger guide to limit the upward movement of the follower.

My invention further comprises the method of balling plants, consisting essentially of the following steps; first, removing the plant from the earth by cutting a cylindrical body of soil from the earth by means of a thin tubular blade arranged encircling the plant; second, wrapping the blade with its inclosed cylinder of soil in a suitable wrapper; third, forcing the cylinder of soil and the wrapper from the tubular blade, thus leaving the cylinder of soil inclosed in the wrapper.

The accompanying drawings illustrate my invention.

Figure 1 is a perspective side elevation of my improved transplanter showing a tree with its cylinder of soil attached, in place in the transplanter. In this view the wrapper is indicated by dotted lines. Fig. 2 is a perspective view of the same with the cylinder of soil forced out of the tubular blade into the wrapper.

A represents the thin tubular blade which is provided on one side with a slot A' adapted to allow the entrance of a tree into the blade.

B is a follower arranged to reciprocate in the tubular blade A and is provided with a plant receiving opening B' corresponding to the slot A'. in the tubular blade, and is adapted to allow the tubular blade and the follower to be placed around the plant.

To the handle C is attached a plunger guide D which is provided with an angular guide opening $d$ which is adapted and arranged to guide the plunger $b$ of the follower B. The plunger is secured at its lower end to the follower, and extends upward and is arranged in the guide D and is adapted to be reciprocated in such guide to thereby reciprocate the follower in the cylindrical tube. The plunger guide opening and the plunger are both angular in cross section to thereby prevent the follower from turning in the blade.

It is necessary to remove more earth with some plants than with others on account of the difference in depth to which the roots extend, and in order to accurately gage the length of the cylinder of earth thus removed with the plant, I provide the plunger $b$ with an adjustable stop E which encircles the plunger and is secured in place by a set screw $e$, and arranged to engage with the plunger guide D to limit the upward movement of the follower. Dotted lines in Fig. 2 indicate the stop adjusted to cause the tubular blade to remove a short cylinder of soil with the plants.

In practice the transplanter is placed around the tree by placing the tree in the slot in the tubular blade and the follower, and the tubular blade is then forced into the ground to cut a cylinder of soil, inclosing the roots of the tree, from the earth. The follower B engaging with the surface of the earth causes the plunger b to slide upward through the plunger guide D until the stop E engages with the plunger guide. Then the tubular blade with the cylinder of soil is removed from the earth and the blade with its inclosed cylinder of soil is wrapped in a suitable flexible wrapper F, as indicated in dotted lines in Fig. 1, then the follower is advanced to push the soil from the blade, by means of the plunger b and the tubular blade A is thus withdrawn from the wrapper and the cylinder of soil is left inclosed in a wrapper which will hold it in shape until it is removed to the place desired and replanted.

When the plants are set out, the transplanter is used to remove a cylinder of soil from the earth to leave a hole of proper size to receive the cylinder of soil surrounding the roots of the tree.

By means of the adjustable stop, the depth to which the follower will allow the blade to be inserted into the earth, can be accurately adjusted to accommodate the length of the cylinder upon the plants.

Now, having described my invention, what I claim as new, and desire to secure by Letters Patent, is—

1. The transplanter set forth consisting of the combination with a tubular blade provided with a handle and having a slot in one side to allow the introduction of the plant into such blade, of a follower arranged to reciprocate in such blade and provided with an opening arranged and adapted to allow the introduction of the plant into such blade through the slot therein, and a suitable plunger arranged to reciprocate the follower.

2. The transplanter set forth, comprising a tubular blade having in one side a slot and provided with a handle; a plunger guide fixed to such handle; a follower arranged to reciprocate in such tubular blade and provided with a plant receiving opening arranged to receive a plant therein through the slot in the tubular blade; a plunger arranged in the plunger guide and provided with an adjustable stop adapted for adjustment upon the plunger and to engage the plunger guide to limit the upward movement of the follower.

3. The transplanter set forth comprising the tubular blade provided in one side with the slot and provided with a handle; a plunger guide fixed to such handle and provided with the angular guide opening; a follower arranged to reciprocate in such tubular blade and provided with the plant receiving opening arranged to receive the plant therein through the slot in the tubular blade; the plunger, angular in cross section attached at its lower end to the follower, and arranged in the angular plunger guide, and an adjustable stop arranged for adjustment upon the plunger to engage the plunger guide to limit the upward movement of the follower.

HERMAN BALDRIDGE.

Witnesses:
ALFRED I. TOWNSEND,
F. M. TOWNSEND.